Figure 1:
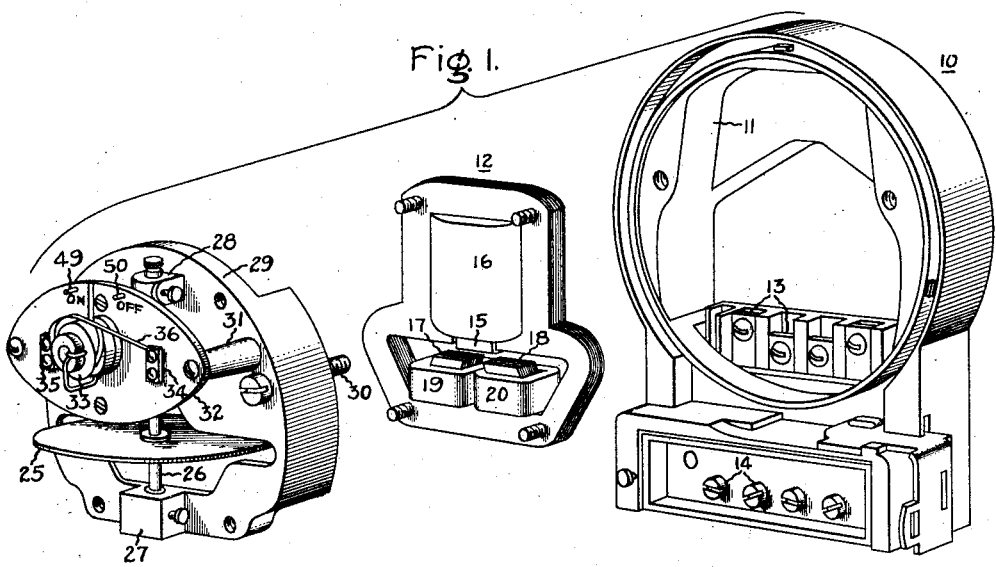

June 2, 1942.　　C. I. HALL ET AL　　2,285,204
CONDITION CONTROL SYSTEM
Filed April 1, 1941　　3 Sheets-Sheet 1

Inventors:
Chester I. Hall,
Fredrick S. Marcellus,
by Harry E. Dunham
Their Attorney.

June 2, 1942.  C. I. HALL ET AL  2,285,204
CONDITION CONTROL SYSTEM
Filed April 1, 1941  3 Sheets-Sheet 2

Inventors:
Chester I. Hall,
Fredrick S. Marcellus,
by Harry E. Dunham
Their Attorney.

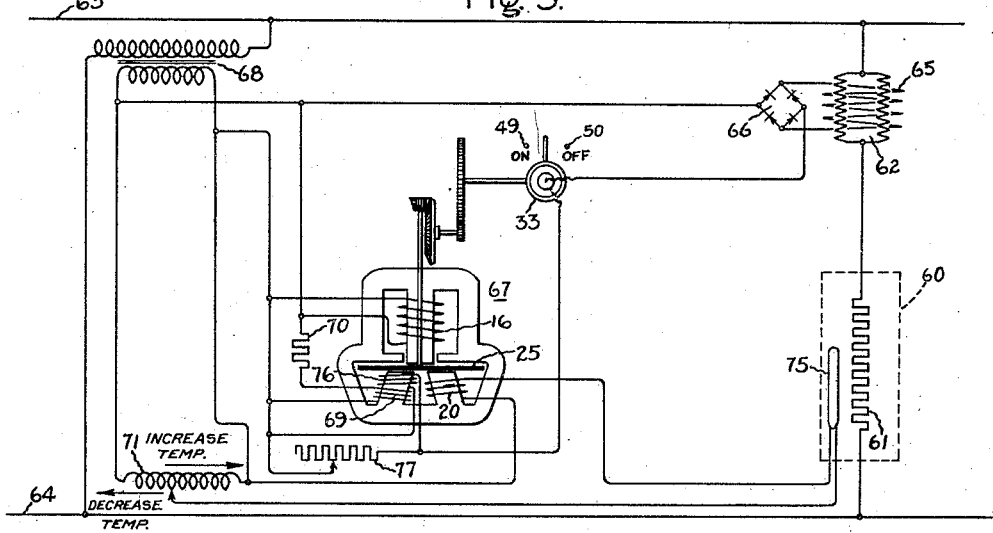

Patented June 2, 1942

2,285,204

UNITED STATES PATENT OFFICE 2,285,204

CONDITION CONTROL SYSTEM

Chester I. Hall, Schenectady, and Fredrick S. Marcellus, Scotia, N. Y., assignors to General Electric Company, a corporation of New York Application April 1, 1941, Serial No. 386,314

23 Claims. (Cl. 236—15)

Our invention relates generally to condition control systems, and has particular application to the control of temperature of enclosures such as buildings, industrial heating furnaces, and the like. As will be understood from the following specification and claims, however, our invention is not necessarily limited in its broader aspects to the control of temperature, but is adapted to the control of other conditions of media.

In automatic temperature control systems three fundamental types of control are in common use. The first and simplest of these is the "on-off" control in which the output of the condition changing means or the input to the conditioned space is changed substantially instantaneously between any two predetermined limiting values in response to whether the temperature of the space is above or below the desired value. For example, in an oil burning steam heating system the output of the heater is varied almost instantaneously from zero to substantially its maximum value, the "time off" and the "time on" being directly dependent upon the position of a room thermostat. In the "on-off" type of control it is not necessary that the output be varied from zero to one hundred percent, but it may be varied between any two desired values.

The second fundamental type of control is known as "floating" control in which the output of the heater or other condition changing means or the input to the conditioned space is varied relatively slowly between predetermined limits as distinguished from substantially instantaneously in the "on-off" control. For example, a valve controlling the flow of steam through a conduit may be moved slowly from full open to full closed by a reversible motor responsive directly to the position of a room thermostat.

The third fundamental type of control is known as "proportional" control, and is that type in which the output of a heater or other condition changing means or the input to the conditioned space is varied in direct proportion to the position of a condition responsive member. For example, a valve controlling the flow of steam through a conduit may be directly connected to a thermostat, whereby the valve takes up a definite position for each position of the thermostat.

While the "on-off" type of control is characterized by relatively quick response, it is often found objectionable in heating systems using a large input of energy, such as industrial electric heating furnaces, because of the tendency of the relatively high rate of heat input to cause over-temperature during the "on" period and conversely to cause under-temperature during the "off" period. Such overshooting of the control point frequently causes a cyclic variation of temperature of a magnitude greater than that permissible in closely regulated processes. Our invention provides means which may be applied to the control of an "on-off" system whereby the temperature fluctuations caused by overshooting of the control point are reduced to an almost imperceptible value and whereby the system is endowed with a proportional characteristic.

The simple floating control mentioned above inherently produces less violent fluctuation in the temperature than "on-off" control because of the slow movement of the condition controlling element. This type of control however is open to the objection that it is very slow to respond to changes in the condition. Because of the fact that in a floating control the condition controlling element is moved at a constant rate, the slow response of a floating control is particularly objectionable where relatively large deviations of a condition from normal are to be compensated. Accordingly, our invention, when applied to a floating type of control, provides an improved system in which the rate of movement of the condition controlling member is made proportional to the magnitude of the deviation of the condition being controlled from the desired value. With such an arrangement our control system no longer possesses the well understood drooping or proportional characteristic of the usual proportional control system.

Accordingly, it is an object of our invention to provide means for maintaining the condition of a medium substantially constant at any selected value.

It is a further object of our invention to provide means for controlling the temperature of an enclosure within very close limits.

It is a still further object of our invention to provide a control system for an industrial heating furnace which is capable of maintaining a selected temperature with only very slight and substantially imperceptible fluctuations.

It is a still further object of our invention to provide means for modifying an "on-off" type of control system whereby the system possesses a proportional characteristic.

Another object of our invention is to provide improved means for modifying a "floating" control system, whereby the rate of corrective movement of the floating operator is made proportional to the deviation of the controlled condition from its normal value.

Still another object of our invention is to provide a new and improved type of continuously oscillating operator for cyclicly varying the output of a heater or other condition changing means or the input to a conditioned space.

It is a still further object of our invention to provide a continuously oscillating rotatable operator having condition increasing and condition decreasing positions with means for varying the speed of the operator in accordance with the extent of deviation of the condition from its normal value.

It is a specific object of our invention to provide a variable speed oscillating operator for regulating an "on-off" control system adapted to maintain nearly constant the temperature of an electric furnace.

In accordance with our invention we utilize an induction disk relay provided with a contact mechanism which has spaced "on" and "off" positions and with windings specially arranged to produce automatic reversal of the direction of rotation of the relay between its positions, the rotations in opposite directions taking place at speeds determined by the extent of deviation of the condition from its normal value. Specifically, the windings are arranged to produce upon the disk opposing torques of unequal magnitude, and include a small reversing coil arranged to be energized or deenergized in accordance with the position of the contact mechanism cyclicly to insure alternate predominance of the opposing torques. In order to produce the desired temperature response, the value of the torque unaffected by the reversing coil is controlled in accordance with the temperature or other condition being regulated. Since the difference between the torques determines the speed of rotation of the induction disk in each direction, the speeds of rotation in opposite directions are varied inversely in accordance with the magnitude of the deviation of the condition from its normal value, whereby the ratio of time off to time on per cycle is varied to correspondingly vary the average output per cycle of the heating means.

Figure 2:
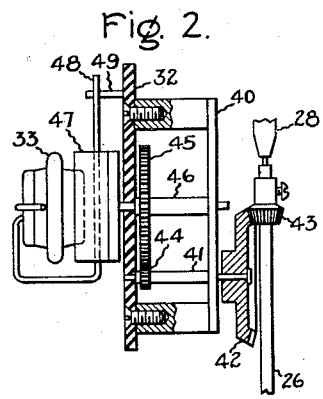
Figure 3:
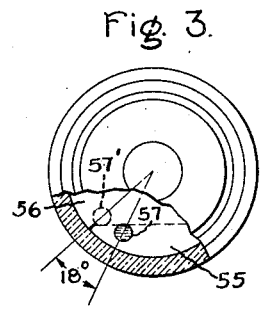
Figure 4:
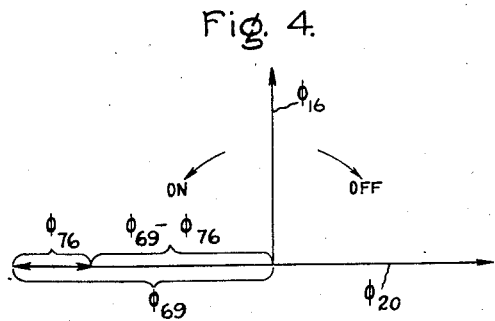
Figure 6:
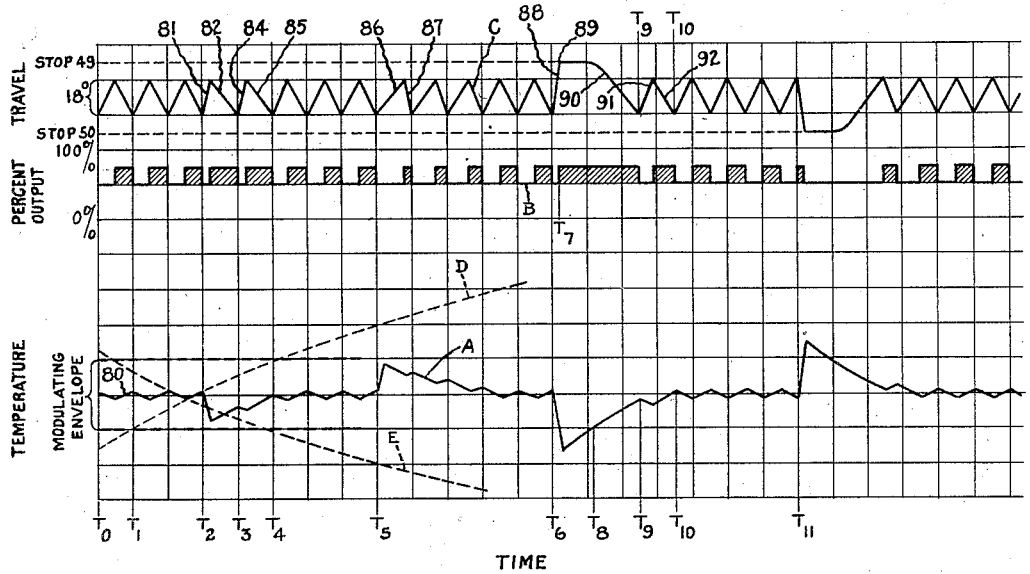
Figure 7:
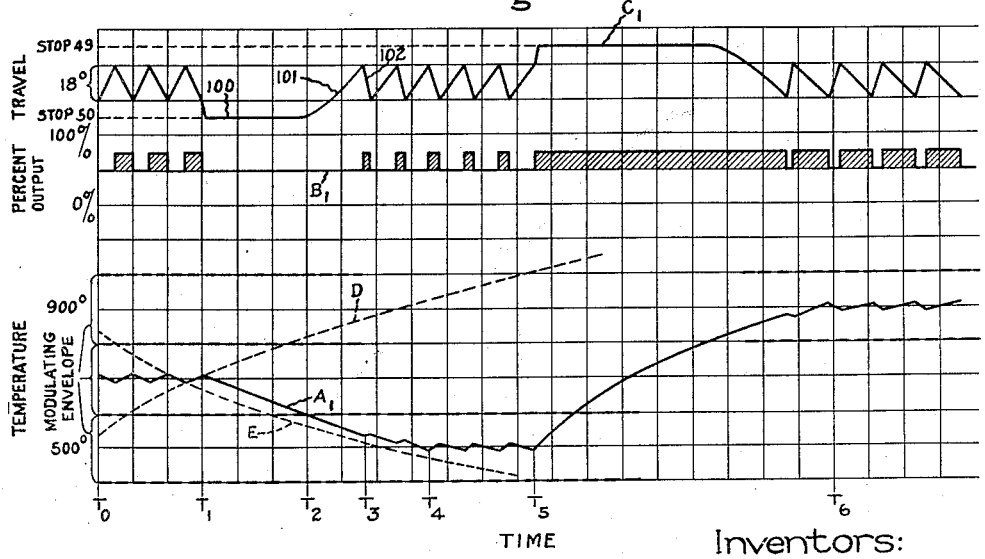

For a more complete understanding of our invention, and for a further appreciation of its many objects and advantages, reference should now be had to the following detailed specification taken in connection with the accompanying drawings in which Fig. 1 is an exploded perspective view of our induction relay; Fig. 2 is a detailed view partly in section showing the driving connection between the induction disk and the contact mechanism of our induction relay; Fig. 3 is a detailed view partly in section of one suitable type of contact mechanism; Fig. 4 is a vector diagram showing the relation of the various torque-producing fluxes in our relay; Fig. 5 is a schematic diagram of circuit connections showing our induction relay applied to the control of an "on-off" reactor system of electric furnace control; Fig. 6 is a time chart showing various conditions of operation of the system with a constant temperature setting; Fig. 7 is a time chart showing various conditions of operation of the system when the temperature setting is changed; Fig. 8 is a schematic diagram of circuit connections showing our invention applied to the "on-off" control of an oil burner motor for a domestic heating system; Fig. 9 is a perspective view of a control panel fitted with apparatus embodying our invention; and Fig. 10 is a fragmentary circuit diagram illustrating the application of our invention to a control system of the floating type.

Referring now to the drawings, and particularly to Figs. 1, 2 and 3, we have shown in detail the structure of an induction relay forming part of our invention. The relay casing, indicated generally at 10, is recessed at 11 for the reception of a core and coil structure indicated generally by the reference numeral 12, and is provided with coil connections 13 and terminal connections 14. The relay core structure 12 is multipolar and comprises a central pole 15 carrying an exciting coil 16 and two radially displaced poles 17 and 18 carrying energizing coils 19 and 20 respectively. The energizing coil 19 comprises two windings connected in opposing relationship, one winding being arranged to set up a flux of the order of two per cent of the flux of the other winding, as will be more fully described hereinafter. As will also be further described in connection with Figs. 5 and 8, the energizing coil 20 may be wound in the same sense as the main winding of the coil 19, or oppositely, depending upon whether or not certain auxiliary apparatus is used.

To complete the relay structure a rotatable induction disk 25, mounted upon a shaft 26 carried in bearings 27 and 28, is positioned for cooperation with the opposing poles 15, 17 and 18 of the core structure 12. The bearings 27 and 28 are mounted upon a face plate 29 which is adapted to be attached to the relay casing 10 by bolts 30 at opposite sides of the plate. The face plate 29 has formed on the front surface thereof two bosses 31 adapted to support a mounting plate 32. Rotatably mounted upon the plate 32 is a mercury button contact mechanism 33 having its terminals connected to terminal blocks 34 and 35 by flexible electric conductors 36. The relay shaft 26 is connected to rotate the mercury button through a gear reduction shown in detail in Fig. 2. Referring to Fig. 2, a bearing plate 40 is mounted in spaced relation to the rear face of the mounting plate 32. Between the plates 32 and 40 is mounted a shaft 41 carrying at one end a beveled gear 42 for cooperation with a beveled gear 43 on the shaft 26. Near the other end of the shaft 41 is mounted a spur gear 44 which meshes with a spur gear 45 on a shaft 46. The mercury button 33 is mounted in a hub 47 attached to the shaft 46 and carrying a radially projecting arm 48. Preferably the hub 47 is formed of insulating material. The radially projecting arm 48 is adapted to engage a pair of stops 49 and 50 set in the mounting plate 32 for the purpose of limiting rotation of the mercury button 33.

Referring now to Fig. 3, the mercury button contact mechanism which we prefer to use as a contact mechanism is shown in detail. Such a rotatable mercury button is described and claimed in Patents 2,101,092 and 2,101,093 to J. H. Payne, issued December 7, 1937, and assigned to the same assignee as the present application. The mercury button has been shown partly in section in order to illustrate the spaced relation of the "on" and "off" positions of the button. In Fig. 3 the reference numeral 55 indicates a pool of mercury and 56 represents an insulating baffle apertured at 57. As is fully explained in the above mentioned patents to Payne, the circuit through the mercury button is completed when the mercury passes through the aperture 57 in the baffle 56. Because of the relatively great surface tension of mercury it is found that the aperture 57 must be almost completely submerged below the surface of the mercury before the mercury will flow through the aperture. This position of the mercury button is shown in full lines in Fig. 3. Also, because of the high surface tension of mercury, it is necessary almost completely to withdraw the aperture from the pool of mercury before the conducting connection through the aperture 57 is broken. This position of the mercury button is indicated by the dotted aperture 57' of Fig. 3. Of course, the angular distance between the full and dotted line positions shown in Fig. 3 will depend largely upon the diameter of the aperture 57. With the size aperture which we prefer to use, it has been found that the "on" and "off" positions of the mercury button 33 are angularly spaced apart by approximately eighteen degrees. We wish to have it understood, of course, that, if desired, other contact mechanisms having spaced "on" and "off" positions may be used. For example, a cam operated switch or a spring biased toggle switch may be suitably arranged for operation in connection with our invention.

Referring now to Figs. 4 and 5, I have shown in Fig. 5 how our induction relay may be connected to regulate the temperature of a reactor controlled electric heating furnace 60. The furnace 60 contains a resistance heating element 61 which is connected for "on-off" control through a saturable core reactor 62. When the resistance heater 61 is controlled through a reactor such as 62, the "on" and "off" limiting values of the output of the resistor 61 preferably lie intermediate zero and one hundred per cent. As is well understood by those skilled in the art, this arrangement of itself tends to prevent temperature fluctuations due to overshooting of the control point. The heating resistance 61 is connected for energization from a pair of line alternating current conductors 63 and 64. A direct current winding 65 of the saturable core reactor 62 is energized through a rectifier bridge 66 which is connected to be controlled by the mercury button 33 of an induction relay according to our invention. In Fig. 5 the induction relay is represented generally by the reference numeral 67. Preferably the reactor 62 is constructed to have an impedance such that when it is unsaturated a current of substantial heating value is supplied to the resistance heater 61, such as approximately 65% of the maximum heating current when the reactor is fully saturated, as indicated in Figs. 6 and 7.

The exciting winding 16 of the relay 67 is connected for energization directly from the secondary terminals of a control transformer 68, the primary terminals of which are connected between the line conductors 63 and 64. The potential exciting coil 16 is preferably highly inductive and therefore sets up a flux in the relay core structure which is ninety electrical degrees out of phase with the secondary voltage of the control transformer 68. This flux lags behind the transformer secondary voltage, and may be represented by the vector $\phi_{16}$ of Fig. 4. For cooperation with the flux of the coil 16 to produce a torque in one direction upon the disk 25, an energizing winding 69 is arranged upon the leg 17 of the relay. The winding 69 is the main winding of the coil 19 of Fig. 1 and is substantially non-inductive relative to the coil 16. For energization the winding 69 is connected to the secondary winding of the control transformer 68 through a substantially non-inductive circuit including a resistor 70. Because of the non-inductive nature of the circuit of the winding 69, the magnetic flux set up by this winding is substantially in phase with the voltage of the secondary winding of the control transformer 68. This flux therefore leads the flux of the coil 16 by substantially ninety electrical degrees and may be represented by the vector $\phi_{69}$ of Fig. 4. It may be assumed for purposes of illustration that the combined effect of the windings 16 and 69 tends to produce rotation of the disk 25 in a direction to rotate the mercury button 33 counter-clockwise toward its "on" position.

For producing a torque in the opposite direction upon the disk 25 the coil 20, similar to the winding 69 but reversely wound, is positioned upon the leg 18 of the relay. The coil 20 is connected for energization from a voltage divider 71 or other suitable voltage varying device. The voltage divider 71 is connected for energization across the secondary terminals of the control transformer 68. The circuit of the coil 20 is primarily resistive and includes a temperature sensitive resistance varying element 75. The temperature sensitive element 75 comprises a resistor having a marked negative temperature coefficient of resistance, and is preferably of the type described and claimed in the copending application of Chester I. Hall, Serial No. 327,901, filed April 4, 1940, and assigned to the same assignee as the present application. As described in the copending application the element 75 comprises an outer electrode in the form of a tube, an inner electrode centrally located in the tube, and a sintered mass of granular resistance material within the tubular electrode embedding the lower end of the inner electrode. One such sintered granular resistance material may comprise magnesium oxide, sodium silicate and copper oxide. The flux set up by the coil 20 is substantially one hundred and eighty electrical degrees out of phase with the voltage of the secondary winding of the control transformer 68 due to the reversed winding of the coil 20. Thus it will be evident that the time phase of the flux set up by the coil 20 will differ from that of the flux set up by the winding 69 by approximately one hundred and eighty electrical degrees and will differ from that of the coil 16 by approximately ninety electrical degrees in a lagging sense. The flux of the coil 20 may be represented by the vector $\phi_{20}$ of Fig. 4.

If desired the one hundred and eighty degree phase shift between the fluxes $\phi_{69}$ and $\phi_{20}$ may be produced by winding the coil 20 in the same direction as the winding 69 and energizing the voltage divider 71 from the secondary windings of the control transformer 68 through an insulating transformer which may have a 1 to 1 ratio and will be more fully described with reference to Fig. 3.

Each of the fluxes $\phi_{69}$ and $\phi_{20}$ interacts with the constant exciting flux $\phi_{16}$ to produce a torque upon the conducting disk 25. Each torque depends for its direction upon the direction of phase angular shift between the two fluxes producing it, and for its magnitude upon the magnitudes of the fluxes and the magnitude of the phase angle between them. For example, consider the various torques established. Most of the flux set up in the central pole 15 by the coil 16 passes across the narrow air gaps above the disk 25 and returns without cutting the disk. Some of the exciting flux, however, cuts the disk 25 and returns through the radially displaced poles 17 and 18. This portion of the exciting flux sets up circulating currents in the conducting disk which lag behind the flux $\phi_{16}$ by substantially ninety electrical degrees. Since these circulating currents are in phase with the flux $\phi_{20}$ and one hundred and eighty degrees out of phase with the $\phi_{69}$, their magnetic fields are acted upon by the fluxes $\phi_{69}$ and $\phi_{20}$ to produce oppositely directed torques. Similarly, the fluxes in the radially displaced poles set up by the windings 69 and 20 pass through the disk 25 and return through the radial core portion above the disk. These fluxes $\phi_{69}$ and $\phi_{20}$ establish circulating currents in the disk which are respectively in phase and one hundred and eighty degrees out of phase with the flux $\phi_{16}$. Therefore the flux $\phi_{16}$ acts upon the magnetic fields of the circulating currents set up by the fluxes $\phi_{69}$ and $\phi_{20}$ to produce oppositely directed torques. Inspection will show that the torque produced by the flux $\phi_{69}$ acting upon the currents set up by the flux $\phi_{16}$ is in the same direction as the torque produced by the flux $\phi_{16}$ acting upon the currents set up by the flux $\phi_{69}$. The same is true of the fluxes $\phi_{16}$ and $\phi_{20}$.

In order to cause cyclic automatic reversal in the direction of rotation of the induction disk 25, we provide a small reversing winding 76 which may be wound upon the same spool with the winding 69 and is connected to set up a flux opposing the flux set up by the winding 69. The winding 76 is primarily resistive and is connected for energization directly from the secondary winding of the control transformer 68 in series with the contact mechanism 33. It will therefore be seen that the winding 76 will be energized during the "on" periods of the furnace and will be deenergized during the "off" period of furnace operation. The reversing winding 76 is designed to set up a flux having a magnitude of the order of two per cent of the magnitude of the flux set up by the winding 69, and the energization of the winding 76 may be varied by changing the setting of a variable resistor 77 connected in shunt with the winding 76.

Referring now to Fig. 4, the flux of the winding 76 may be represented to an enlarged scale by a flux $\phi_{76}$ directly opposing the flux $\phi_{69}$. It will be recalled that, due to the inclusion of the temperature sensitive resistor 75 in circuit with the coil 20, the magnitude of the flux $\phi_{20}$ is dependent upon the temperature within the furnace 60. The normal value of the flux $\phi_{20}$, that is the value of the flux $\phi_{20}$ when the furnace is at the desired temperature, is intermediate the value of the flux $\phi_{69}$ and the resultant flux $\phi_{69}-\phi_{76}$. For purposes of illustration it may be assumed that the normal value of the variable flux $\phi_{20}$ is less than the value of the fixed flux $\phi_{69}$ by one-half the value of the fixed flux $\phi_{76}$. As will be apparent from the following description, this means that as the electric furnace 60 is cyclicly turned on and off by our induction relay an average furnace output midway between the limiting points of furnace output will be just sufficient to balance the heat losses.

Referring once more to Fig. 5, it will be seen that the direct current winding 65 of the saturable core reactor 62 and the reversing winding 76 of the relay 67 will be energized when the mercury button 33 is in its "on" position and will remain energized until the mercury button arrives at its "off" position. Likewise the direct current winding of the reactor and the reversing winding of the relay will be deenergized at the time the mercury button arrives at its "off" position and will remain deenergized until the mercury button reaches its "on" position.

From Fig. 4, it will now be apparent that the three magnetic fluxes $\phi_{16}$, $\phi_{69}$ and $\phi_{20}$ produces upon the rotatable disk 25 two oppositely directed torques. Normally, the torque set up by the fluxes $\phi_{16}$ and $\phi_{69}$, tending to rotate the mercury button 33 to its "on" position, is predominant. However, when the mercury button arrives at its "on" position the reversing winding 76 is energized to buck down the flux $\phi_{69}$ sufficiently far to permit the fluxes $\phi_{16}$ and $\phi_{20}$ to produce a resultant torque in the opposite direction to rotate the mercury button 33 to its "off" position. Upon arrival of the mercury button at its "off" position the reversing winding 76 is again deenergized and the flux $\phi_{69}$ again becomes predominant. Therefore without any change in the magnitude of the flux $\phi_{20}$, that is without change in the temperature of the furnace 60, the relay 67 will oscillate back and forth cyclicly to turn the furnace 60 on and off. For purposes of illustration, it may be assumed that with a cycle time of fifty per cent "on" and fifty per cent "off" the average furnace output will just balance the heat losses.

Referring now to Figs. 6 and 7, we have shown a number of time charts by which the operation of our furnace control system may be illustrated. We wish to have it understood, of course, that these charts have been drawn to a disproportionate scale in order more clearly to illustrate our invention, and that therefore the magnitude of the temperature fluctuations shown thereon is not to be considered proportionate to that actually obtained in practice. Fig. 6 illustrates the operation of our system when the desired temperature setting is allowed to remain fixed at one selected value and under conditions of temporary load change on the furnace. Fig. 7 illustrates the operation of our invention when the temperature setting of the system is changed.

Referring first to Fig. 6, the curve A represents the temperature of the furnace 60, the curve B represents the percentage output of the heating resistor 61, and the curve C represents the angular travel of mercury button 33 in degrees, all of the curves being drawn with time as the abscissa. The curves D and E are heating and cooling curves respectively of the furnace 60. Beginning with a time $T_0$ when the temperature of the furnace is at its desired value, it will be observed that the mercury switch cycles from "on" to "off" continuously, completing a complete cycle in a time $T_0$ to $T_1$. As indicated by the output curve, the furnace is on for fifty per cent of this cycle and off for fifty per cent. As previously stated this condition is merely assumed for the purpose of illustration, but it will be understood, of course, that any other condition of balance may exist in practice. As the system cycles from "off" to "on" with the temperature remaining at the desired value, small fluctuations in temperature such as that indicated at 80 upon the curve A, will of course occur due to the continual turning off and on of the furnace. It has been found however that these normal fluctuations are imperceptibly small. By way of example, in one sample installation upon which we have run tests over a considerable period of time, it has been found that a temperature of 700 degrees F. in an electric furnace may be maintained with a maximum deviation of less than one degree Fahrenheit.

As a further illustration, however, let it be assumed that at a time $T_2$ the temperature of the furnace is suddenly reduced by some external cause, such as the opening of a furnace door. Let it be further assumed that the decrease in temperature of the furnace at the time $T_2$, while it reduces the flux $\phi_{20}$ to some extent, is not sufficient to reduce the flux $\phi_{20}$ to a value less than that of $\phi_{69}-\phi_{76}$. The reduction of the flux $\phi_{20}$ results from the increased resistance of the resistor 75 at lower temperature. Referring now to the curve C in Fig. 6, it will be observed that the time $T_2$ the furnace had just been turned off and therefore the reversing coil 76 of the relay was deenergized. At this time, therefore, the relay was rotating the mercury switch in a counter-clockwise direction under the influence of the resultant flux $\phi_{69}-\phi_{20}$. With the decrease in furnace temperature the flux $\phi_{20}$ was reduced also so that the opposing torque exerted upon the disk 25 by the flux $\phi_{20}$ was reduced. Because of the reduced opposing torque the resultant torque due to the flux $\phi_{69}-\phi_{20}$ is increased and the disk moves toward the "on" position at a more rapid rate of speed, as is shown by the increased slope of the curve C of Fig. 6 at the time $T_2$. When the mercury switch arrives at its "on" position the furnace is turned on and the reversing winding 76 is energized. With the flux of the winding 76 opposing the flux of the winding 69 the resulting flux $\phi_{69}-\phi_{76}$ is reduced to a value less than the diminished value of $\phi_{20}$. However, the resultant flux $\phi_{20}-\phi_{69}+\phi_{76}$ is small compared to the resultant flux $\phi_{69}-\phi_{20}$. In other words, for operation of the mercury switch in the clockwise direction to turn the furnace off the operating flux $\phi_{20}$ is only slightly larger than the restraining flux $\phi_{69}-\phi_{76}$, while for operation of the switch in the counter-clockwise direction to turn the furnace on the operating flux $\phi_{69}$ is considerably larger than the restraining flux $\phi_{20}$. For this reason the relay rotates toward the "on" position at a much higher rate of speed than normal, as shown by the portion 81 of the curve C in Fig. 6, and rotates toward the "off" position at a much lower rate of speed than normal, as indicated by the slope of the portion 82 of the curve C. New length of the cycle, however, remains substantially unchanged as indicated in the drawings. Thus it will be seen that during the cycle between the times $T_2$ and $T_3$ the ratio of time on to time off and thus the average output per cycle of the furnace has been increased by inversely varying the speeds of rotation of the induction relay in opposite directions of travel, whereby the average output per cycle of the furnace has been increased in proportion to the deviation of the furnace temperature from normal. The effect of the relatively long "on" period of the furnace during the cycle $T_2$ to $T_3$ may be seen from the portion 83 of the curve A of Fig. 6. The portion 83 of the curve A follows the heating curve D of the furnace. At the time $T_3$ the deviation of the temperature from its normal value is less than it was shortly after the time $T_2$. Therefore the value of the flux $\phi_{20}$, though somewhat reduced below its normal value, is greater than it was at the beginning of the previous cycle. It will now be apparent that the speed of rotation of the induction disk toward the "on" position, as shown by the slope of the portion 84 of the curve C of Fig. 6, will be somewhat greater than normal though somewhat less than its speed of rotation in this direction during the previous cycle. Likewise the speed of rotation of the induction disk toward its "off" position as shown by the slope of the portion 85 of the curve C of Fig. 6 will be slightly greater than the speed of rotation indicated by the slope of the portion 82 of the curve but will still be slightly less than normal. Therefore during the cycle indicated between the times $T_3$ and $T_4$ the ratio of time on to time off and the average output per cycle of the furnace will still be above normal, but will be somewhat reduced with respect to the ratio of time on to time off during the cycle $T_2$ to $T_3$. As indicated upon Fig. 6, it is assumed that at the time $T_4$ the furnace has again reached its normal temperature and that the cycling continues in a normal manner until a time $T_5$.

At the time $T_5$ it may be assumed that some external cause results in a sudden increase in furnace temperature. The sudden increase in furnace temperature at the time $T_5$ has been assumed to be such that the resulting increase in the magnitude of the flux $\phi_{20}$ is not sufficient to make $\phi_{20}$ larger than $\phi_{69}$. Now by comparison with the operation of our system previously explained in detail it will be apparent that, since the furnace was off at the time $T_5$, the increase in the value $\phi_{20}$ will so restrain the disk 25 that its rotation to the "on" position under the influence of $\phi_{69}-\phi_{20}$ will proceed at a speed lower than normal as indicated by the portion 86 of the curve C. Similarly, rotation of the disk toward the "off" position under the influence of the increased resultant flux $\phi_{20}-\phi_{69}+\phi_{76}$ will proceed at a rate of speed greater than normal as indicated by the slope of the portion 87 of the curve C. Thus, during the cycle following the time $T_5$ the average furnace output per cycle is decreased by inversely changing the speeds of rotation of the induction disk in opposite directions in accordance with the value of the temperature responsive flux $\phi_{20}$. As indicated on Fig. 6, the two cycles following the portion 87 of the curve C take place with the induction disk rotating at abnormal speeds determined by the temperature of the furnace, and are such as to gradually increase the average output per cycle of the furnace to its normal value. The deviation from average furnace output per cycle is proportional to the deviation of furnace temperature from normal.

Let it now be assumed that without changing the temperature setting of the furnace, the furnace temperature is suddenly decreased at a time $T_6$ to a value below the lower limit of the region marked "modulating envelope" on Fig. 6. This means that the furnace temperature has been reduced to a value sufficiently low to diminish the magnitude of the flux $\phi_{20}$ to less than that of $\phi_{69}-\phi_{76}$. Referring now to curves B and C of Fig. 6, it will be seen that the furnace had just been turned off at the time $T_6$. At this time, therefore, the mercury switch was being rotated toward its "on" position under the influence of the resultant flux $\phi_{69}-\phi_{20}$. Due to the diminution of the retarding flux $\phi_{20}$ the rotation of the mercury button toward its "on" position proceeds at a greater speed because of the increased value of the resultant flux $\phi_{69}-\phi_{20}$. The increased rate of speed is indicated by the slope of the portion 88 of the curve C of Fig. 6. When the mercury switch arrives at its "on" position the furnace is turned on, as at a time $T_7$ indicated on curve B, and the reversing winding 76 is connected to oppose the flux of the winding 69. However, because of the large diminution of furnace temperature the flux $\phi_{69}-\phi_{76}$ is still larger than the flux $\phi_{20}$. The mercury button therefore continues to rotate in the clockwise direction until the pin 48 engages the stop 49, as indicated at 89 of curve C of Fig. 6. The mercury button will now remain against the stop 49 until a time $T_8$ at which the furnace temperature is increased to a point where $\phi_{20}$ is equal to $\phi_{69}-\phi_{76}$. At this time the opposing fluxes operating upon the induction disk 25 are exactly balanced. Shortly after this time when the furnace temperature has further increased to a point where the flux $\phi_{20}$ is slightly larger than the flux $\phi_{69}$—$\phi_{76}$ the mercury switch will begin to rotate in the clockwise direction at a gradually increasing rate in accordance with the gradually increasing magnitude of the flux $\phi_{20}$ in response to increasing furnace temperature. As indicated by the slope of the portion 90 of the curve C of Fig. 6, however, the mercury button reaches its "off" position at a time $T_9$ before it attains its normal speed and before the temperature has returned to normal. At the time $T_9$ therefore the furnace is turned off. Since the temperature and hence the flux $\phi_{20}$ are still below normal, the speed of the mercury button back toward its "on" position under the influence of the resultant flux $\phi_{69}$—$\phi_{20}$ is greater than normal, as indicated by the slope of the portion 91 of the curve C. Similarly the slope of the portion 92 of the curve C is slightly less than normal. The ratio of time on to time off during the cycle from $T_9$ to $T_{10}$ is thus slightly increased. Since the temperature of the furnace at the time $T_{10}$ differs from its normal value by only the amount of its normal cyclic deviation, as shown by the curve A, the flux $\phi_{20}$ and hence the speed of the induction disk will be normal; and thus the portion 93 of the curve C will have approximately its normal slope. The system therefore now begins to cycle in its normal manner as indicated during the three cycles following the time $T_{10}$.

If it is now assumed that at a time $T_{11}$ the temperature of the furnace is suddenly increased by some external cause to a value sufficient to increase the flux $\phi_{20}$ to a value greater than the flux $\phi_{69}$, the mercury button will be rotated beyond its "off" position and into engagement with the fixed stop 50. By analogy to the regulating action described immediately above, it will be apparent that the average output per cycle of the furnace will be reduced in accordance with the magnitude of the deviation of furnace temperature from its normal value, as reflected in the relative speeds of rotation of the induction disk in opposite direction under the influence of the temperature responsive flux $\phi_{20}$.

Referring now to Fig. 7, we have shown a representative number of examples of the manner in which our system operates when the normal temperature setting of the apparatus is changed with the ambient temperature and other conditions of furnace operation remaining the same. Let it be assumed that the time $T_0$ the apparatus is set to maintain the temperature of the furnace at 700 degrees F. and is cycling in the normal manner to maintain the temperature at this point with very slight fluctuations. As before, it will be assumed that the ratio of time on to time off during each cycle is 1 to 1 to maintain balanced conditions. If now at a time $T_1$ the temperature setting of the apparatus is changed to maintain a normal temperature of, for example, 500 degrees F. the conditions of furnace operation are indicated at Fig. 7. The change in the setting of the apparatus is effected by changing the position of the sliding contact of the voltage divider 71 to impress a greater voltage across the circuit including the coil 20 and the temperature sensitive resistor 75 in series. Since for operation of our system at the selected temperature, the normal value of the flux $\phi_{20}$ must always be intermediate $\phi_{69}$—$\phi_{76}$, the voltage impressed upon the temperature sensitive circuit by the voltage divider 71 must be increased to such a point that when the resistance of the resistor 75 has increased to its value at 500 degrees F. the current flowing through the coil 20 will have approximately its normal value. Under the conditions assumed the value of the flux $\phi_{20}$ must return to aproximately $\phi_{69}$—1/2$\phi_{76}$. The flux $\phi_{20}$ will not return to exactly the magnitude as will be explained hereinafter. The process by which the temperature of the furnace, and thus the resistance of the resistor 75, is changed to reestablish the normal value of the current through the coil 20 is indicated upon the curve $A_1$, $B_1$ and $C_1$ of Fig. 7, which correspond to the curves A, B and C of Fig. 6. The heating and cooling curves D and E of the furnace have also been indicated on Fig. 7. At the time $T_1$ the mercury switch has just arrived at its "off" position. Had the temperature setting not been changed the mercury switch would at this time begin to rotate in counter-clockwise direction under the influence of the resultant flux $\phi_{69}$—$\phi_{20}$. However, due to the change in temperature setting, the value of the flux $\phi_{20}$ has been increased to a value greatly in excess of the flux $\phi_{69}$. Therefore, the mercury switch continues to rotate in the clockwise direction until the pin 48 engages the stop 50, thereby maintaining the furnace in its "off" position. As indicated by the portion 100 of the curve $C_1$, the mercury switch will remain against the stop 50 until a time $T_2$ when the furnace temperature comes just within the new modulating envelope determined by the new temperature setting. At this time the flux $\phi_{20}$ will be just equal to the flux $\phi_{69}$ and the rotatable disk 25 will be balanced. Since the mercury switch is still against its "off" stop, however, the furnace remains off and the temperature continues to fall with a resulting continued decrease in the magnitude of the flux $\phi_{20}$. As the flux $\phi_{20}$ decreases below the value of the flux $\phi_{69}$ in response to the decrease in temperature of the furnace, the mecury button 32 rotates in a counterclockwise direction toward its "on" position at a gradually increasing rate. As shown by the portion 101 of the curve $C_1$, the mercury button reaches its "on" position before its speed comes up to normal. At a time $T_3$ therefore the furnace is turned on. Since the temperature at the time $T_3$ has not yet reached its new normal value, however, the mercury button is moved in the opposite direction relatively quickly as shown at 102 on the curve $C_1$. The ratio of time on to time off per cycle is thus gradually brought back to a normal value over the course of a number of cycles until at a time $T_4$, when the temperature has arrived at the new setting, the apparatus again begins to cycle in a regular manner. The normal cycle of the apparatus will now be somewhat different, however, from the normal cycle with a temperature setting of 700 degrees because a smaller average furnace output per cycle is sufficient to maintain a temperature of 500 degrees. It will be observed from Figs. 6 and 7 that it has been assumed that the heating and cooling curves have approximately the same slope at a temperature of 700 degrees. Since the slope of these curves is different at 500 degrees, the furnace will heat up more quickly and will cool more slowly as indicated by the portions 102 and 103 respectively of the curve $A_1$ of Fig. 7. The difference in the heating and cooling rates at the new temperature setting will produce a difference in the normal speeds of rotation of the disk 25 in the clockwise and counter-clockwise directions. Therefore, as indicated at Fig. 7, while the total cycle time will remain approximately the same, the average input per cycle, or the ratio of time on to time off, will be somewhat reduced in comparison to the normal cycle at 700 degrees.

If now it is assumed that at a time $T_6$ indicated on Fig. 7, the temperature setting of the apparatus is changed to maintain a normal temperature of, for example, 900 degrees F. the mercury button will rotate in the counter-clockwise direction to maintain the furnace on continuously until the new normal temperature is reached, and will thereupon reestablish normal cycling operation under conditions determined by the relative slopes of the heating and cooling curves at 900 degrees F. It is believed that this operation will be understood by comparison with the operation of the furnace under reduced temperature setting conditions explained in detail immediately above. It is desired to call attention to the fact that the normal cycle of the apparatus at 900 degrees, as shown at and after the time $T_6$ of Fig. 7, indicates that a greater average furnace output per cycle is required to maintain a temperature of 900 degrees than is required to maintain 500 or 700 degrees. This is indicated by the relative slopes of the heating and cooling portions of the curve $A_1$ after the time $T_6$, by the ratio of time off to time on of the curve $B_1$ after this time, and by the relative speeds of rotation of the disk 25 in the clockwise and counter-clockwise directions as indicated by the various slopes of the curve $C_1$ after the time $T_6$.

It will be understood by those skilled in the art that curves of Figs. 6 and 7 have been magnified in a disproportionate manner to illustrate more clearly the principle of operation of our invention. For example, the cycle time is shown relatively long in proportion to the shape of the heating and cooling curves D and E. Under practical conditions the furnace temperature will not rise or fall as quickly as has been shown in relation to the normal cycle time, so that more cycling operations than have been illustrated will ordinarily take place during a return to normal temperature from a deviation of the magnitudes which have been shown by way of example.

By actual test it has been found that, while the total cycle time varies slightly with the load, it remains substantially constant for all practical purposes. In an apparatus which we have built and tested for controlling an electric furnace a total cycle time of approximately thirty seconds has been found suitable. However, it will be understood that the cycle time must be selected in accordance with the circumstances of each installation. For example, the thermal capacity of the heater, the insulation between the heated space and the surrounding space, and the time lag between energization of the heater and delivery of heat to the space will all have an effect upon the cycle time selected.

Referring now to Fig. 8, we have shown our invention in slightly different form applied to the control of an oil burner motor 105 of the type commonly used in connection with domestic heating systems. The induction relay 67 and the connected control circuit are similar to the corresponding parts of Fig. 5 and have been assigned like reference numerals. To illustrate a possible modification in the form of our invention, however, we have shown the coil 20 as wound in the same direction as the winding 69 and energized from the secondary winding of the control transformer 68 through an insulating transformer 106 preferably having a 1 to 1 ratio. It will be understood by those skilled in the art that if the insulating transformer 106 is suitably designed the secondary voltage of the insulating transformer may be made to differ from the secondary voltage of the control transformer 68 by substantially one hundred and eighty electrical degrees, whereby the requisite phase difference between the current in the windings 19 and 20 may be obtained. In Fig. 8 we have also shown the motor 105 as controlled by a line contactor 107 which is in turn controlled by a relay 108. Thus in Fig. 8 when the mercury switch 33 is in its "on" position the relay 108 is energized through the mercury switch from the secondary terminals of the control transformer 68, and closes its contacts 109 to energize the line contactor 107 from the secondary terminals of the control transformer 68.

We have shown in Fig. 9 a control panel upon which is mounted an assembly of apparatus embodying our invention as shown in Figs. 5 and 8. The induction relay 67 is shown mounted at the top of the panel above the control transformer 68, the variable resistor 77 and the relay 108. Upon the door of the panel is mounted the voltage divider 71 which is provided with a manually operable handle 110 extending through the door to enable an operator to change the temperature setting of the apparatus as desired. A scale calibrated directly in temperature may be mounted upon the outside of the panel door for cooperation with a pointer attached to the shaft of the voltage divider. For indicating purposes a milliammeter 115 may be mounted in an easily visible position upon the panel and connected in the circuit of the temperature sensitive element as indicated at Fig. 8. Thus it may be seen that our invention may be embodied in a very simple and relatively small unitary apparatus suitable for easy application to a large variety of condition changing means.

Thus far we have described our invention only as applied to "on-off" control systems to reduce the magnitude of temperature fluctuations due to overheating and undercooling. It will be evident to those skilled in the art that a continuously oscillating temperature control system such as we have described has no differential between its "off" and "on" positions, and for this reason overheating and undercooling is minimized.

As pointed out at the beginning of this specification our invention may also be applied to control systems of the floating type. Such an arrangement is diagrammatically illustrated at Fig. 10, wherein we have shown the line contactor 107 of Fig. 8 provided with a set of normally open and a set of normally closed contacts 120 and 121 respectively. The contactor 107 may be connected for energization to a control circuit similar to that shown in Fig. 8. The contacts 120 and 121 are arranged to control the direction of rotation of a substantially constant speed reversible motor 122 which may be any of a number of types well known to those skilled in the art. The motor 122 is shown connected through a worm and worm gear 123 and 124 respectively to rotate a threaded shaft 125 which threadedly engages a fixed bracket 126. The threaded shaft 125 is connected to a floating operator shown as a valve seat 127 to control the flow of steam through a conduit 128 and thereby regulate the thermal input to a space being heated.

From the detailed description of our control system previously given with reference to Figs. 5, 6 and 7, it will be understood that the ratio of the time that the contacts 120 are closed to the time that the contacts 121 are closed will depend upon the relative speeds of rotation of the induction disk 25 in opposite directions. The speeds of rotation of the disk depend upon the magnitude of the deviation of the space temperature from its desired value. Thus, under normal conditions, the contacts 120 and 121 will be closed for equal periods of time per cycle and the motor 122 will rotate in each direction for the same length of time. Since it is assumed that the motor 122 is a substantially constant speed motor, the valve 127 will then oscillate equal distances on each side of a mean position. If now, as due to a load change upon the system, the temperature deviates from its normal value, the time of rotation of the motor 122 in one direction will be greater than its time of rotation in the other direction so that the mean position of the valve 127 will progress in the desired direction to allow more or less steam to pass through the conduit 128. Since the relative values of the speed of rotation of the induction disk 25 in opposite directions, and therefore the relation of time off to time on of the contactor 107, is proportional to the magnitude of the deviation of the temperature from its normal value, it will be apparent that the rate of progression of the mean position of the valve 127 will be proportional to the magnitude of the temperature deviation from normal. As the space temperature gradually returns to normal due to the greater average opening of the valve 127 the rate of progression of the mean position of the valve will fall to zero, and the valve will take up a new mean position. When the valve has taken up its new mean position the space temperature will of course have returned to its normal value, so that normal cycling of the apparatus will now cause the valve to oscillate equal distances to each side of the new means position. It will be understood that a reduction of load upon the system, as due to an increased outside temperature, will cause the mean position of the valve to progress in the opposite direction and cause to rest nearer to the fully closed position. It will now be observed that in a system of this nature the mean position of the valve 127 has no fixed relation to the temperature of the temperature sensitive element 75. For this reason if the heat load upon the system is changed so that a different value of heat input is required through the conduit 128, the valve 127 will always take up a new mean position in which the heat input through the conduit 128 is just sufficient to balance the heat losses and maintain the conditioned space at precisely the desired temperature. The valve will always thereafter continue to oscillate equal distances back and forth on either side of its new mean position. Since, therefore, there is no fixed relation between the mean position of the valve 127 and the temperature of the element 75, a system of the type illustrated in Fig. 10 does not possess the proportional characteristic which produces the undesirable sub-calibration well known to those skilled in the art. In connection with the system shown in Fig. 10 it is worth noting that whenever the temperature is at its normal value the rates of time on to time off will be 1:1 regardless of the load on the system.

It will now be clear that we have described a control system which may be readily applied to almost any common "on-off" type of condition changing arrangement with the result that the usual objectionably wide deviations of the condition from a normal value are eliminated. Furthermore, our simple and inexpensive control system may be applied to the usual floating control arrangement with results superior to those obtainable from the usual modulated control systems, such as floating control or proportional control. Although we have illustrated our invention only as applied to the control of space heating systems, we wish to have it understood that in its broader aspects it may be applied to other condition control systems such as, for example, cooling systems, humidifying systems, fluid pressure systems, and the like. By way of illustration, in Fig. 10 the conduit 128 might be connected to a source of fluid pressure and to an enclosure, the pressure of which is to be maintained constant.

While we have shown and described only certain preferred embodiments of our invention, many variations and modifications will undoubtedly occur to those skilled in the art. For example, our oscillating induction relay depends for its operation upon the relative magnitude of two opposing torques, one of which is variable in accordance with the value of a condition. Each of the torques in turn has a magnitude dependent upon both the magnitude and phase relation of a certain flux to a constant exciting flux. In all embodiments of our invention which have been illustrated and described the variable torque has been controlled by changing the magnitude of the flux combining with the exciting flux to produce the torque. It will, of course, be understood by those versed in the art that, if desired, this variable torque could be controlled by maintaining constant the magnitude of all fluxes and varying the phase relation of one flux and the exciting flux in accordance with the value of the condition being controlled. It will therefore be understood that we intend in the appended claims to cover all such modifications as fall within the true spirit and scope of our invention.

What we claim as new and desire to secure by Letters Patent of the United States, is:

1. In a system for controlling a condition, movable control means having a condition increasing position and a condition decreasing position, means for cyclicly moving said control means between said positions, and means responsive to said condition for controlling the speed of movement of said control means between said positions while maintaining the total cycle time substantially constant.

2. In a system for controlling a condition, movable control means having a condition increasing position and a condition decreasing position, means for cyclicly moving said control means between said positions, and means responsive to said condition for varying inversely the speeds of said control means in opposite directions.

3. In a condition control system, condition changing means, means for controlling said condition changing means to maintain a normal value of said condition comprising a rotatable element having a condition increasing position and a condition decreasing position, oscillating means for continuously moving said element between said positions, condition responsive means, and means under the control of said condition responsive means to vary inversely the speeds of rotation of said rotatable element in opposite directions in proportion to the magnitude of deviation of said condition from said normal value.

4. In a condition control system, condition changing means, means for cyclicly energizing and deenergizing said condition changing means comprising a rotatable element having spaced on and off positions, automatic reversing means operatively associated with said rotatable element for causing it to oscillate continuously between said positions and thereby maintain a predetermined normal average output per cycle of said condition changing means, said normal average output per cycle being sufficient to maintain said condition at a predetermined normal value, and condition responsive means arranged to produce an inverse variation in the speeds of said rotatable member in opposite directions proportional to the magnitude of deviation of said condition from said normal value, whereby the average output per cycle of said condition changing means is regulated in accordance with said magnitude of deviation.

5. In a system for regulating the temperature of an enclosure, heating means for supplying heat to said enclosure, induction means for controlling said heating means comprising a movable element having spaced heat increasing and heat decreasing positions, oscillating means for continuously moving said element between said positions, said oscillating means including automatic reversing means adapted to be energized when said element takes up one of said positions and to be deenergized when said element takes up the other of said positions, and means responsive to the temperature of said enclosure arranged to control the relative rates of speed of said movable element in opposite directions.

6. In a system for regulating the temperature of an enclosure, heating means for supplying heat to said enclosure, a floating operator for regulating the input of heat to said enclosure, reversible motor means operatively associated with said floating operator, an induction relay for controlling said reversible motor means comprising a rotatable element having spaced heat increasing and heat decreasing positions, oscillating means for continuously rotating said element between said positions, said oscillating means including automatic reversing means adapted to be energized when said element takes up one of said positions and to be deenergized when said element takes up the other of said positions, and means responsive to the temperature of said enclosure arranged to control the relative rates of speed of said rotatable element in opposite directions.

7. In a system for regulating the temperature of an enclosure, heating means for supplying heat to said enclosure, operating means arranged to vary substantially instantaneously the output of said heating means between two predetermined fixed limits, and induction relay for controlling said operating means comprising a rotatable element having spaced heat increasing and heat decreasing positions, oscillating means for continuously rotating said element between said positions, said oscillating means including automatic reversing means adapted to be energized when said element takes up one of said positions and to be deenergized when said element takes up the other of said positions, and means responsive to the temperature of said enclosure arranged to control the relative rates of speed of said rotatable element in opposite directions.

8. In a system for controlling the temperature of an enclosure, heating means for supplying heat to said enclosure, an induction relay comprising a rotatable induction disk having spaced heat increasing and heat decreasing positions for controlling said heating means to maintain said temperature at a predetermined normal value, means for producing continuous oscillation of said element between said positions cyclicly to increase and decrease the output of said heating means and thereby maintain a predetermined normal average output per cycle of said heating means, said oscillating means comprising self-reversing means controlled by the position of said rotatable element, and means responsive to the temperature of said enclosure arranged to vary inversely the speeds of rotation of said rotatable element in opposite directions in proportion to the magnitude of deviation of said temperature from a normal value.

9. In a system for maintaining the temperature of a furnace substantially constant at a predetermined normal value, heating means for said furnace, relay means for controlling said heating means comprising a rotatable induction disk having spaced heat increasing and heat decreasing positions, means for applying to said disk a torque tending to rotate the disk toward one of said positions, automatic means under the control of said relay means for cyclicly changing the value of said torque between predetermined fixed limits, means for applying to said disk an oppositely directed torque having a normal value intermediate said predetermined fixed limits, and means responsive to the temperature of said furnace for varying the magnitude of said oppositely directed torque in proportion to said temperature, whereby the speeds of rotation of said disk in opposite directions are varied inversely in proportion to the deviation of said temperature from said normal value.

10. In a system for maintaining the temperature of a furnace substantially constant at a predetermined normal value, heating means for said furnace, operating means for varying substantially instantaneously the output of said furnace between two predetermined fixed limits, relay means for controlling said operating means comprising a rotatable induction disk having spaced heat increasing and heat decreasing positions, means for applying to said disk a torque tending to rotate it toward said heat increasing position, automatic means under the control of said relay means for cyclicly changing the value of said torque between second predetermined fixed limits, means for applying to said disk an oppositely directed torque having a normal value intermediate said second fixed limits, and means responsive to the temperature of said furnace for varying the magnitude of said oppositely directed torque in proportion to said temperature, whereby the speeds of rotation of said disk in opposite directions are varied inversely in proportion to the deviation of said temperature from said normal value.

11. In a system for maintaining the temperature of a space substantially constant at a predetermined normal value, heating means for said space, a floating operator for controlling the flow of heat to said space, constant speed reversible motor means operatively connected to said floating operator, means for controlling said motor means comprising an induction relay provided with a rotatable disk having spaced on and off positions, means for applying to said disk a torque tending to rotate the disk toward said on position, automatic means under the control of said relay for cyclicly changing the value of said torque between predetermined fixed limits, means for applying to said disk an oppositely directed torque having a normal value intermediate said fixed limits, and means responsive to the temperature of said space for varying the magnitude of said oppositely directed torque in proportion to said temperature, whereby the speeds of rotation of said disk in opposite directions are varied inversely in proportion to the deviation of said temperature from said normal value.

12. In a system for controlling a condition, movable control means having a condition increasing position and a condition decreasing position, means for applying to said control means two normally unequal opposing forces, means operatively associated with said control means cyclicly to cause alternate predominance of said forces, and means responsive to said condition to control the magnitude of one of said forces.

13. In a system for controlling a condition, movable control means having a condition increasing position and a condition decreasing position, means for applying to said control means two normally unequal opposing forces tending to move said means in opposite directions, means operated by said control means cyclicly to vary the magnitude of one of said forces for causing said control means normally to oscillate between said positions, and means responsive to said condition for controlling the magnitude of the other of said opposing forces.

14. In a system for maintaining a condition substantially constant at a predetermined normal value, condition changing means, control means for said condition changing means comprising a rotatable induction element having condition increasing and condition decreasing positions, electromagnetic means for applying to said element two normally unequal opposing torques tending to rotate said element in opposite directions, automatic reversing means operated by said element cyclicly to vary the magnitude of one of said torques between two predetermined fixed limits for causing alternate predominance of said forces, condition responsive means, and electro-magnetic means controlled by said condition responsive means for varying the magnitude of the other of said forces in proportion to the value of said condition.

15. In a condition control system, condition changing means, an induction relay for controlling the output of said condition changing means comprising a movable element having spaced condition increasing and condition decreasing positions, an exciting winding for said induction relay, means for supplying a constant exciting current to said exciting winding, a first energizing winding for said induction relay, means for supplying a constant energizing current to said first energizing winding to apply to said movable element a torque tending to move said element toward one of said positions, a second energizing winding for said relay, means for energizing said second energizing winding to apply to said rotatable element an oppositely directed torque, a reversing winding for said induction relay arranged to oppose the effect of said first energizing winding, means controlled by said movable element for cyclicly energizing and disabling said reversing winding to cause alternate predominance of said torques, and condition responsive means for controlling the energization of said second energizing winding.

16. In a system for controlling the temperature of an enclosure, temperature changing means, an induction relay for controlling the output of said temperature changing means comprising a rotatable element having spaced temperature increasing and temperature decreasing positions, an exciting winding for said induction relay, means for constantly energizing said exciting winding to set up an exciting flux in said relay, a first energizing winding for said relay, means for constantly energizing said first energizing winding to set up a flux differing in phase from said exciting flux by substantially ninety electrical degrees in one sense, a second energizing winding for said relay, means for energizing said second energizing winding to set up a flux differing in phase from said exciting flux by substantially ninety degrees in an opposite sense, automatic reversing means for said movable element comprising a reversing winding the energization of which is controlled by said movable element cyclicly to set up a flux opposing the flux of said first energizing winding, and means responsive to the temperature of said space for controlling the energization of said second energizing winding.

17. In a system for controlling the temperature of an enclosure, temperature changing means, an induction relay for controlling the output of said temperature changing means comprising a rotatable element having spaced temperature increasing and temperature decreasing positions, a highly inductive exciting winding for said induction relay, a source of voltage for energizing said exciting winding to set up an exciting flux in said relay, a first relatively non-inductive energizing winding for said relay, a relatively non-inductive circuit for energizing said first energizing winding from said source of voltage to set up a flux which leads said exciting flux by substantially ninety electrical degrees, a second relatively non-inductive energizing winding for said relay, means for energizing said second energizing winding from said source of voltage to set up a flux which lags said exciting flux by substantially ninety electrical degrees, a non-inductive reversing winding for said relay, means controlled by said movable element for cyclicly energizing said reversing winding to set up a flux opposing the flux of said first energizing winding, and variable impedance means responsive to the temperature of said enclosure for controlling the energization of said second energizing winding.

18. In a system for controlling the temperature of an enclosure, temperature changing means, an induction relay for controlling the output of said temperature changing means comprising a rotatable element operatively connected to a contact mechanism having spaced on and off positions, a highly inductive exciting winding for said induction relay, a source of voltage for energizing said exciting winding to set up an exciting flux in said relay, a first relatively non-inductive energizing winding for said relay, a relatively non-inductive circuit for energizing said first energizing winding from said source of voltage to set up a flux which leads said exciting flux by substantially ninety electrical degrees, a second relatively non-inductive energizing winding for said relay, said second energizing winding being reversely wound with respect to said first energizing winding, means comprising an adjustable voltage divider for energizing said second energizing winding from said source of voltage to set up a flux which lags said exciting flux by substantially ninety electrical degrees, a non-inductive reversing winding for said relay, means controlled by said contact mechanism for cyclicly energizing said reversing winding to set up a flux opposing said leading flux for causing alternate predominance of said leading and lagging fluxes, and variable means responsive to the temperature of said enclosure connected in circuit with said second energizing winding.

19. In a system for maintaining the temperature of an enclosure substantially constant at a predetermined normal value, temperature changing means, an induction relay for controlling the output of said temperature changing means comprising a rotatable element operatively connected to contact means having spaced on and off positions, a highly inductive exciting winding for said induction relay, a source of control voltage for energizing said exciting winding to set up an exciting flux in said relay, a first relatively non-inductive energizing winding for said relay, a relatively non-inductive circuit for energizing said first energizing winding from said source of control voltage to set up a flux which leads said exciting flux by substantially ninety electrical degrees, a second relatively non-inductive energizing winding for said relay, means comprising an insulating transformer and an adjustable voltage divider for exciting said second energizing winding from said source of control voltage to set up a flux which lags said exciting flux by substantially ninety electrical degrees, a relatively non-inductive reversing winding for said relay connected in series circuit with said contact means cyclicly to set up a flux opposing the flux of said first exciting winding whereby said rotatable element normally oscillates continuously between said on and off positions, and a resistor having a negative temperature coefficient of resistance positioned in said enclosure and connected in series with said second energizing winding, whereby the speeds of rotation of said element in opposite directions is varied inversely in proportion to the deviation of said temperature from said normal value to control the average output per cycle of said temperature changing means.

20. In a system for controlling the temperature of an enclosure, heating means for supplying heat to said enclosure, operating means for varying substantially instantaneously the output of said heating means between predetermined fixed limits, an induction relay for controlling said operating means comprising a rotatable element operatively connected to a contact mechanism having spaced on and off positions, a highly inductive exciting winding for said induction relay, a source of voltage for energizing said exciting winding to set up a constant exciting flux in said relay, a first relatively non-inductive energizing winding for said relay, a relatively non-inductive circuit for energizing said first energizing winding from said source of voltage to set up a flux which leads said exciting flux substantially ninety electrical degrees, a second relatively non-inductive energizing winding for said relay, means for energizing said second energizing winding from said source of voltage to set up a flux which lags said exciting flux by substantially ninety electrical degrees, a relatively non-inductive reversing winding for said relay, means controlled by contact mechanism for cyclicly energizing said reversing winding to set up a flux opposing said leading flux to cause alternate predominance of said leading and lagging fluxes, and variable resistance means responsive to the temperature of said enclosure for controlling the energization of said second energizing winding.

21. In a system for controlling the temperature of an enclosure, heating means for supplying heat to said enclosure, a floating operator for regulating the input of heat to said enclosure, constant speed reversible motor means operatively connected to said floating operator, an induction relay for controlling said motor means comprising a rotatable element operatively connected to a contact mechanism having spaced on and off positions, a highly inductive exciting winding for said induction relay, a source of voltage for energizing said exciting winding to set up a constant exciting flux in said relay, a first relatively non-inductive energizing winding for said relay, a relatively non-inductive circuit for energizing said first energizing winding from said source of voltage to set up a flux which leads said exciting flux by substantially ninety electrical degrees, a second relatively non-inductive energizing winding for said relay, means for energizing said second energizing winding from said source of voltage to set up a flux which lags said exciting flux by substantially ninety electrical degrees, a relatively non-inductive reversing winding for said relay, means controlled by said contact mechanism for cyclicly energizing said reversing winding to set up a flux opposing said leading flux for causing alternate predominance of said leading and lagging fluxes, and variable resistance means responsive to the temperature of said enclosure for controlling the energization of said second energizing winding.

22. The method of maintaining substantially constant a condition comprising continuously oscillating a control member between spaced condition increasing and condition decreasing positions, maintaining constant the speed of movement of said control member in each direction while said condition remains unchanged, and varying inversely the speeds of movement of said control member in opposite directions whenever said condition departs from its normal value.

23. The method of maintaining substantially constant the value of a condition comprising continuously oscillating a control member between condition increasing and condition decreasing positions, maintaining substantially constant the speed of movement of said control member in each direction while said condition remains unchanged, increasing the speed of movement of said control member toward said condition increasing position and decreasing its speed of movement toward said condition decreasing position whenever said condition rises above its normal value, and increasing the speed of movement of said control member toward said condition decreasing position and decreasing its speed of movement toward said condition increasing position whenever the value of said condition falls below said normal value.

CHESTER I. HALL.
FREDRICK S. MARCELLUS.